US008266263B2

(12) United States Patent  
Cain et al.

(10) Patent No.: US 8,266,263 B2  
(45) Date of Patent: Sep. 11, 2012

(54) DISTRIBUTED PREBOOT EXECUTION ENVIRONMENT (PXE) SERVER BOOTING

(75) Inventors: David T. Cain, Durham, NC (US); Jeffrey B. Jennings, Raleigh, NC (US); Jeffrey D. Young, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/085,176

(22) Filed: Apr. 12, 2011

(65) Prior Publication Data

US 2011/0276671 A1 Nov. 10, 2011

Related U.S. Application Data

(62) Division of application No. 12/350,361, filed on Jan. 8, 2009, now Pat. No. 7,953,793.

(51) Int. Cl.
*G06F 15/177* (2006.01)
*G06F 12/00* (2006.01)
(52) U.S. Cl. ........................................ 709/222; 709/203
(58) Field of Classification Search .................. 709/222, 709/203, 223–229
See application file for complete search history.

(56) References Cited

U.S. PATENT DOCUMENTS

| 7,039,688 | B2 | 5/2006 | Matsuda et al. | |
|---|---|---|---|---|
| 7,139,816 | B2 * | 11/2006 | Anand et al. | 709/220 |
| 7,953,793 | B2 * | 5/2011 | Cain et al. | 709/203 |
| 2003/0005096 | A1 * | 1/2003 | Paul et al. | 709/222 |
| 2004/0078679 | A1 | 4/2004 | Cagle et al. | |
| 2006/0242228 | A1 | 10/2006 | Eggers et al. | |
| 2006/0242400 | A1 | 10/2006 | Anderson et al. | |
| 2007/0253437 | A1 | 11/2007 | Radhakrishnan et al. | |
| 2008/0183812 | A1 * | 7/2008 | Paul et al. | 709/203 |
| 2009/0013416 | A1 | 1/2009 | Friedman et al. | |
| 2009/0217163 | A1 | 8/2009 | Jaroker | |

* cited by examiner

*Primary Examiner* — Zarni Maung  
(74) *Attorney, Agent, or Firm* — Jeffrey T. Holman

(57) ABSTRACT

A computer program product and system are disclosed for distributed Preboot eXecution Environment (PXE) server booting. The computer program product may include an image request module configured to send a PXE boot image request to a master boot server; an assignment receiving module configured to receive a temporary PXE server RAM image and a subset of target machines from the master boot server, the temporary PXE server RAM image configured to assign a recipient target machine as a temporary PXE server, the temporary PXE server configured to agent boot the subset of target machines; a subset boot module configured to send each target machine in the subset of target machines an agent boot image; a subset confirmation module configured to receive a boot confirmation from each target machine, the boot confirmation configured to indicate that the target machine booted successfully; a master confirmation module configured to send a subset boot confirmation to the master boot server, the subset boot confirmation configured to indicate that the subset of target machines booted successfully; and an image receiving module configured to receive an agent boot image.

11 Claims, 10 Drawing Sheets

DISTRIBUTED PREBOOT EXECUTION ENVIRONMENT (PXE) SERVER BOOTING

CROSS-REFERENCE TO RELATED APPLICATIONS

This application is a divisional of U.S. application Ser. No. 12/350,361, filed on Jan. 8, 2009, which is incorporated by reference herein in its entirety.

FIELD OF THE INVENTION

This invention relates to Preboot eXecution Environment (PXE) server booting and more particularly relates to distributed PXE server booting using temporary PXE servers.

BACKGROUND

One of the most challenging tasks for a system administrator is to bootstrap (boot) computer systems, or to start up computer systems into a working state. When many computer clients must be booted, one popular solution is to utilize a PXE booting environment. PXE booting allows a computer to boot without having to physically insert a boot disk into the machine or have an operating system already installed. PXE booting relies on the functionality of the Dynamic Host Configuration Protocol (DHCP) and Trivial File Transfer Protocol (TFTP) to send a small software boot image down to the network interface card of client machines. DHCP is used by a client to locate a boot server from which the client will receive the software boot image. Additionally, TFTP is used to actually download the software boot image. If PXE booting is carried out on a computer lab filled with many client machines, a system administrator may perform unattended operating system installs on each machine simultaneously saving the system administrator from having to install an operating system on each individual computer.

A problem exists where many systems attempt to PXE boot simultaneously. The PXE server machine, also typically configured as a TFTP server, and which is responsible for sending the small software images to the clients, may become overutilized and may not be able to keep up with numerous client requests. Furthermore, if a proxy DHCP server is used, the response packets can get "lost" due to the high demand of machine PXE booting. Industry solutions currently handle this scenario by queuing machines at deploy time, by utilizing pre-existing TFTP servers, and/or using a multicast TFTP configuration (MTFTP) service.

SUMMARY

The present invention has been developed to provide for distributed Preboot eXecution Environment (PXE) server booting.

A computer program product is provided for distributed PXE server booting. These modules in the described embodiments include an image request module, an assignment receiving module, a subset boot module, a subset confirmation module, a master confirmation module, an image receiving module, an additional server assignment module, an additional server confirmation module, and an additional server transmission module.

In one embodiment, the image request module sends a PXE boot image request to a master boot server. Furthermore the assignment receiving module may receive a temporary PXE server RAM image and a subset of target machines from the master boot server. The temporary PXE server RAM image assigns a recipient target machine as a temporary PXE server which PXE boots the subset of target machines. The subset boot module may send each target machine in the subset of target machines an agent boot image. In addition, the subset confirmation module receives a boot confirmation from each target machine which indicates that the target machine booted successfully.

The master confirmation module may send a subset boot confirmation to the master boot server. The subset boot confirmation indicates that the subset of target machines booted successfully. Finally, the image receiving module may receive an agent boot image. In one embodiment, the additional server assignment module assigns one or more additional temporary PXE servers. The additional server confirmation module may receive a subset boot confirmation from each additional temporary PXE server. Furthermore, the additional server transmission module sends each additional temporary PXE server an agent boot image in response to the subset boot confirmation from each additional temporary PXE server.

A system of the present invention is also presented for distributed PXE server booting. The system may be embodied as a network configured to communicate data between a plurality of devices, one or more target machines in communication with the network, one or more target machines assigned as temporary PXE servers in communication with the network, and a master boot server in communication with the network. The one or more target machines assigned as temporary PXE servers may comprise modules configured to functionally perform the necessary steps as described above in relation to the computer program product. In addition, the master boot server may comprise modules configured to functionally perform the necessary steps as described above in relation to the method. Also, the master boot server may also comprise a receiving module, an assignment module, a temporary server confirmation module, an image transmission module, temporary server determination module and a tree determination module. Furthermore, in one embodiment of the system, the temporary server requirement is based on a boot image size and network capacity.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
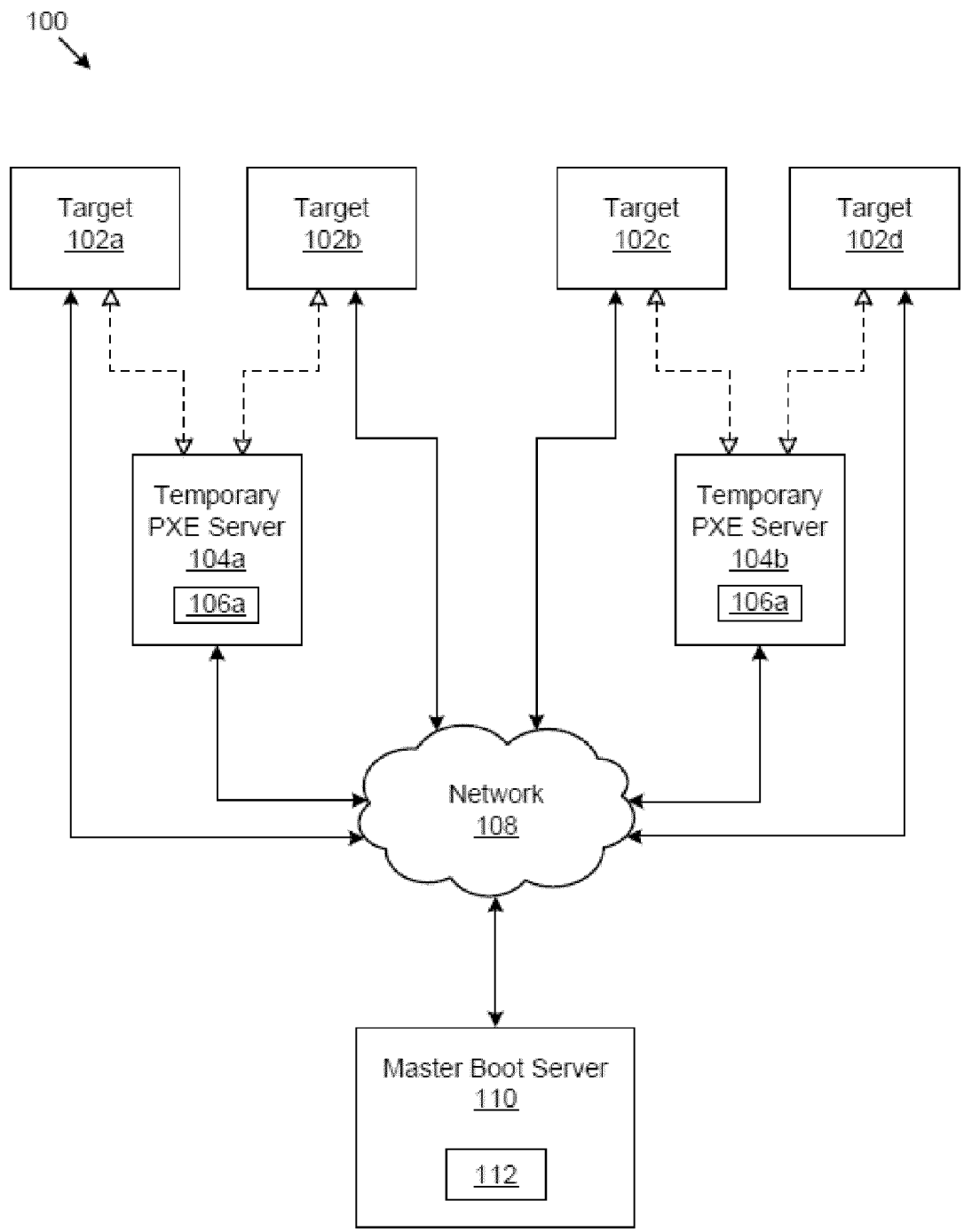
FIG. 1 is a schematic block diagram illustrating one embodiment of a system for distributed PXE server booting.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Definitions:
- Target Machine—Any machine with a task to be performed that requires the execution of an agent.
- Agent—A target machine with a single specific task that need completing and booted with an agent boot. An agent boot may include a RAM image that will boot the target machine in preparation for such tasks as restoring or saving a local hard drive image, joining a network cluster, or beginning an operating system install.
- Master—The dedicated PXE server responsible for defining targets as an agent or a Temporary PXE Server.
- Temporary PXE Server—A target machine that is temporarily serving as a PXE server to send agents to several other target machines. A Temporary PXE Server will become an agent machine after all of its assigned agents are complete.

FIG. 1 illustrates one embodiment of a system 100 for distributed PXE server booting. The system 100 includes multiple target machines 102, multiple temporary PXE servers 104, each with a subset loader 106, a network 108, and a master boot server 110 with a distributed boot loader 112. Those of skill in the art recognize that the system 100 may be simpler or more complex than illustrated, so long as the system 100 includes modules or sub-systems that correspond to those described herein.

A target machine 102 may be any computer system configured with PXE boot code to request and download a boot image. As known by one of ordinary skill in the art, the necessary PXE boot code uses Dynamic Host Configuration Protocol (DHCP) to locate a boot server and Trivial File Transfer Protocol (TFTP) to download the image. Furthermore, a target machine 102 may include a Network Interface Card (NIC) to communicate with the network 108.

A temporary PXE server 104 is a target machine 102 equipped with a subset loader 106. Thus, like a target machine 102, the temporary PXE server 104 may also be configured with PXE boot code to request and download a boot image and may include a NIC to communicate with the network 108. Moreover, each temporary PXE server 104 may be configured to operate TFTP and proxy DHCP to communicate with the delegated target machines 102 and send the boot image to the target machines 102. In some embodiments, a target machine 102 assigned as a temporary PXE server 104 may be configured with a faster processor, greater memory, or other superior system resources than a target machine 102 without such assignment. However, a target machine 102 will not be assigned as a temporary PXE server 104 if it has no possible target machines 102 to assist in booting. This ensures that the assignment of temporary PXE servers 104 results in greater efficiency as the burden of booting target machines is spread out. The subset loader 106a boots the target machines 102a-b that are delegated to the temporary PXE server 104a.

While both the target machines 102a-b and the temporary PXE server 104a are in communication with the network 108 and the master boot server 110, the temporary PXE server 104a exercises actual control over its delegated target machines 102a-b for the booting process. To allow target machines 102a-b delegated to a temporary PXE server 106a to co-exist on the same network 108 as other target machines 102c-d with their accompanying temporary PXE server 104b and a master boot server 110, each temporary PXE server 104a-b and the master boot server 110 may be configured to only respond to specific Media Access Control (MAC) addresses at network boot time. Therefore, a temporary PXE server 104a may only respond to boot image requests from the target machines 102a-b the temporary PXE server 104a is delegated and ignore requests from other target machines 102c-d. Likewise, the master boot server 110 may ignore requests from target machines 102a-b delegated to a temporary PXE server 104a. The network 108 may comprise a global communications network such as the Internet, a cellular communications network, or other communications network. The network 108 may also be a Local Area Network (LAN) or multiple LANs communicating over the internet.

The master boot server 110 may be configured as a standard PXE boot server and as both a DHCP and TFTP server. In addition, a distributed boot loader 112 may reside on the master boot server 110. The distributed boot loader 112 assigns a certain number of target machines 102 to be temporary PXE servers 104 and delegates target machines 102 for each temporary PXE server 104 to boot. Therefore, the master boot server 110 does not become over-utilized in trying to respond to multiple boot requests. Also, with the distributed boot loader 112 assigning temporary PXE servers 104 to be proxy DHCP and TFTP servers to handle the image file transmission process, the network traffic impact is no longer directed at a single DHCP/TFTP server.

One of ordinary skill in the art would appreciate that the system 100 may include multiple master boot servers 110, each providing service to a subset of target machines 102. Each master boot server 110 may be configured to respond only to a specified range of MAC addresses as described above, thus allowing multiple master boot servers 110 to co-exist on the same network 108.

Figure 2:
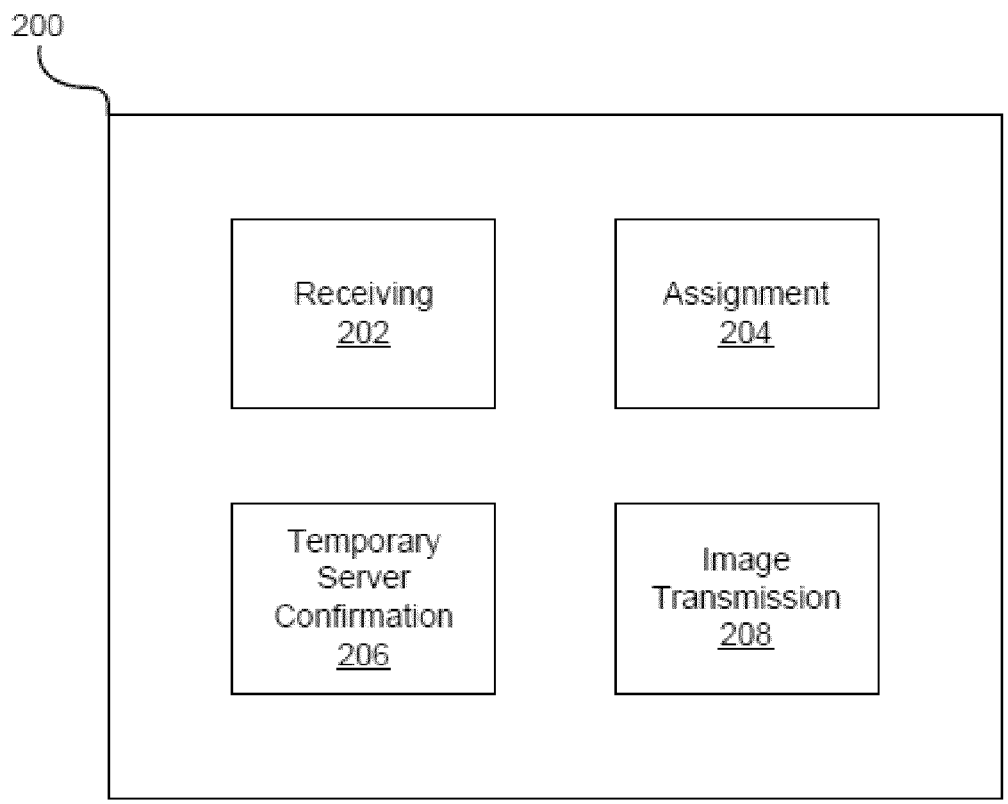
FIG. 2 is a schematic block diagram illustrating one embodiment of a computer program product for distributed PXE server booting.

FIG. 2 illustrates one embodiment of a computer program product 200 for distributed PXE server booting. The computer program product 200 depicts one embodiment of a distributed boot loader 112 and includes a receiving module 202, an assignment module 204, a temporary server confirmation module 206, and an image transmission module 208.

In one embodiment, the receiving module 202 receives a PXE boot request from multiple target machines 102. In some embodiments, the receiving module 202 may store a set of target machines 102 that have made a boot request.

In one embodiment, the assignment module 204 sends one or more target machines 102 a temporary PXE server RAM image and a subset of target machines 102. When each target machine 102 boots with the temporary PXE server RAM image, the target machine 102 becomes a temporary PXE server 104 delegated the subset of target machines 102 to PXE boot. The subset of target machines to be delegated to the temporary PXE server 104 may be represented by a set of MAC addresses for the temporary PXE server 104 to respond to.

In one embodiment, the temporary server confirmation module 206 receives a subset boot confirmation from each temporary PXE server 104 which indicates that all of the target machines 102 delegated to the temporary PXE server 104 have booted successfully. The subset boot confirmation may include all of the MAC addresses corresponding to the target machines 102 delegated to that particular temporary PXE server 104.

In one embodiment, the image transmission module 208 sends a temporary PXE server 104a an agent boot image after receiving the subset boot confirmation from the temporary PXE server 104a. An agent boot image, which boots a target machine as an agent, may comprise a standard, non-PXE server boot RAM image. The agent boot image may be an identical image that the temporary PXE server 104a sent its assigned target machines 102a-b.

Figure 3:
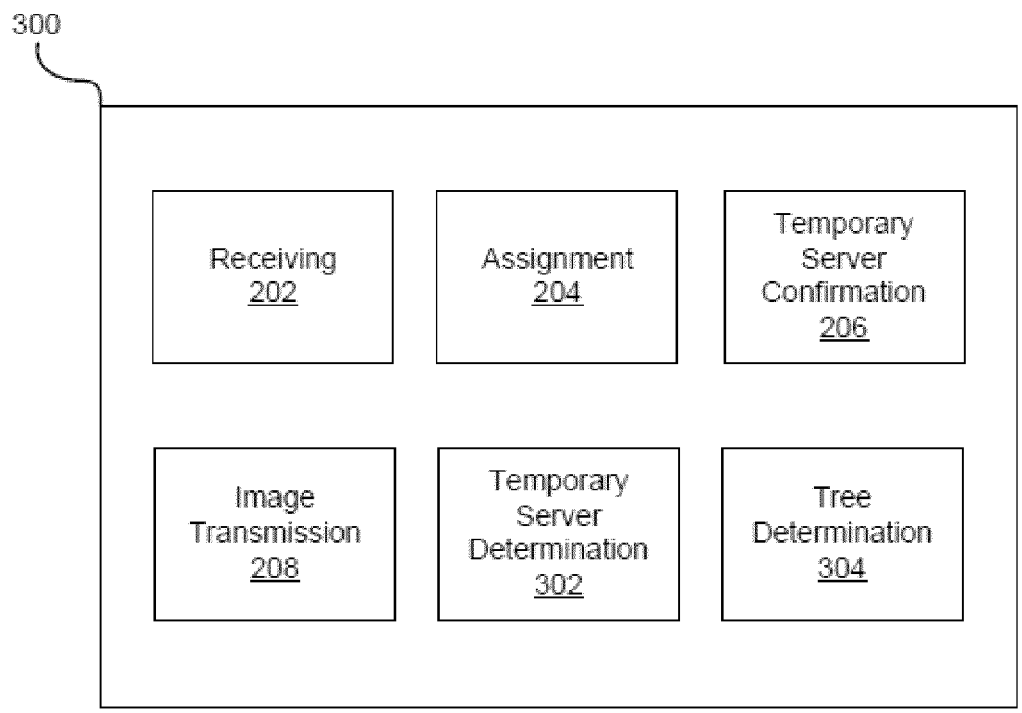
FIG. 3 is a detailed schematic block diagram illustrating one embodiment of a computer program product for distributed PXE server booting.

FIG. 3 illustrates another embodiment of a computer program product 300 for distributed PXE server booting. The computer program product 300 includes the receiving module 202, the assignment module 204, the temporary server confirmation module 206, and the image transmission module 208, wherein these modules include substantially the same features as described above in relation to FIG. 2. Additionally, in one embodiment, the computer program product contains an temporary server determination module 302 and a tree determination module 304.

In one embodiment, the temporary server determination module 302 determines an temporary server requirement. The temporary server requirement may comprise an optimal number of target machines 102 to assign as temporary PXE servers 104 based on a predetermined number of target machines 102 that require booting. Therefore, if a certain number of target machines 102 have requested a boot image, or if a predetermined number of target machines 102 are known to require booting, the temporary server requirement may be an amount of temporary PXE servers that will most efficiently boot the required number of target machines 102. For example, if 20 target machines 102 require booting, the temporary server determination module 302 may determine that four temporary PXE servers 104 are required, each assigned four target machines 102 to boot.

In addition, the temporary server requirement may be determined dynamically at boot-time. In this embodiment, the number of target machines 102 which require booting may be unknown. The temporary server determination module 302 may assign a requesting target machine 102 to be a temporary PXE server 104 for a predetermined number of requesting target machines 102. For example, the temporary server determination module 302 may assign every fifth target machine 102 to be a temporary PXE server 104. Furthermore, the temporary server requirement may be user-configurable. For example, the user may set a maximum or minimum number of temporary PXE server assignments or set the criteria in which a target computer 102 is determined by the temporary server determination module 302 to be a temporary PXE server 102.

The temporary server determination module 302 may assign predetermined target machines 102 to be temporary PXE servers 104 or the assignment may be determined at boot-time based on the boot image size or the network capacity. Furthermore, the temporary server determination module 302 may determine a temporary PXE server 104 assignment based on the specifications of a target machine 102 such as speed, memory, past temporary PXE server 104 performance statistics, and the like.

In one embodiment, the tree determination module 304 determines a booting tree. The booting tree may be a plan which the master boot server 110 follows in assigning temporary PXE servers 104 and delegating target machines 102 to temporary PXE servers 104. The booting tree may be preconfigured by a user or determined prior to boot-time. The booting tree may also be determined dynamically at boot-time upon receipt of boot requests from target machines 102. In determining the booting tree, the tree determination module 304 may consider factors such as bandwidth and network connections between target machines 102, the location of target machines 102, the capabilities of target machine 102, and the like.

Figure 4A:
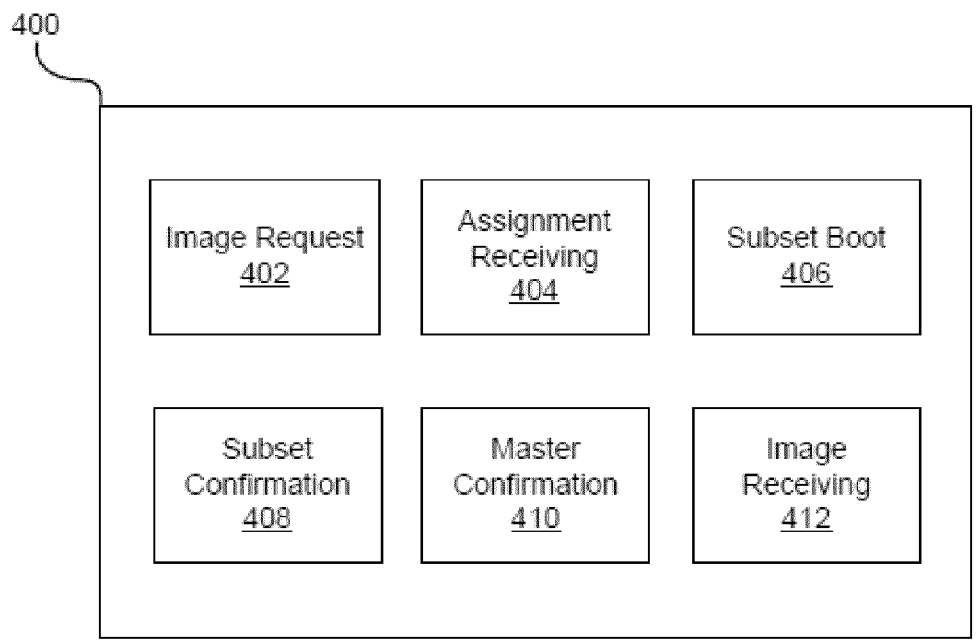
FIG. 4A is a schematic block diagram illustrating one embodiment of a computer program product for distributed PXE server booting.

FIG. 4A illustrates one embodiment of a computer program product 400 for distributed PXE server booting. The computer program product 400 depicts one embodiment of a subset loader 106 and includes an image request module 402, an assignment receiving module 404, a subset boot module 406, a subset confirmation module 408, a master confirmation module 410, and an image receiving module 412.

In one embodiment, the image request module 402 sends a PXE boot request to a master boot server 110. In one embodiment, the assignment receiving module 404 receives a temporary PXE server RAM image and a subset of target machines from the master boot server 110. As previously mentioned, the subset of target machines may be represented by a list of MAC addresses of target machines 102 to respond to. When the target machine 102 boots using the temporary PXE server RAM image, the target machine 102 becomes a temporary PXE server 104. In certain embodiments, the temporary PXE server RAM image installs a TFTP server on the temporary PXE server 104. Also, the temporary PXE server RAM image may also install both a DHCP server and a TFTP server on the temporary PXE server 104.

In one embodiment, the subset boot module 406 responds to the boot requests of the target machines 102 in the subset. The subset boot module 406 may respond to the machines matching the MAC addresses received by the master boot server 110.

In one embodiment, the subset confirmation module 408 receives a boot confirmation from each target machine 102 indicating that the target machine booted successfully. The confirmation may be a request by the target machine 102 to "bootlocal" for the next network boot.

In one embodiment, the master confirmation module 410 sends a subset boot confirmation to the master boot server 110 indicating that the subset of target machines delegated to the temporary PXE server 104 has booted successfully. Sending the subset boot confirmation may be performed by the master confirmation module 410 sending the list of MAC addresses of the subset of target machines to the master boot server 110.

In one embodiment, the image receiving module 412 receives an agent boot image to boot the temporary PXE server 104 with the same image as the other target machines.

Figure 4B:
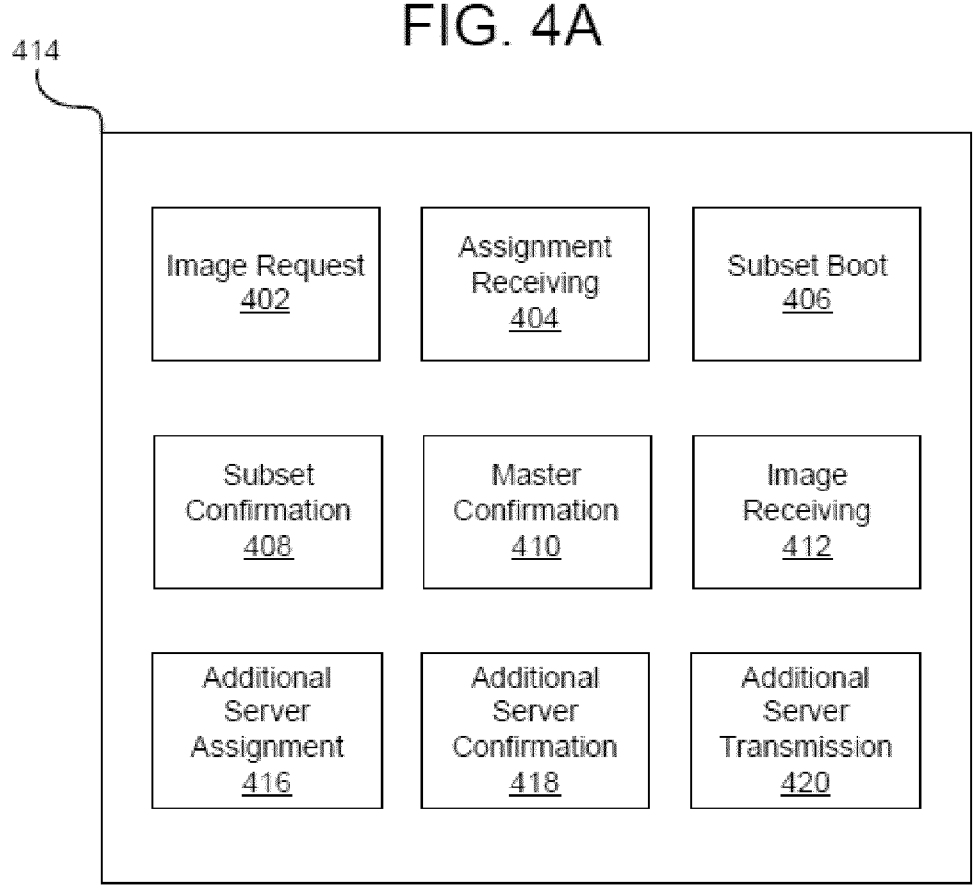
FIG. 4B is a detailed schematic block diagram illustrating one embodiment of a computer program product for distributed PXE server booting.

FIG. 4B illustrates another embodiment of a computer program product 414 for distributed PXE server booting. The computer program product 414 depicts another embodiment of a subset loader 106 and includes similar modules to the computer program product 400 in FIG. 4A. However, the computer program product 414 includes an additional server assignment module 416, an additional server confirmation module 418, and an additional server transmission module 420.

In one embodiment, the additional server assignment module 416 assigns one or more additional temporary PXE servers. The additional server assignment module 416 operates like the assignment module 204 residing on the master boot server 110. Specifically, the additional server assignment module 416 may send one or more target machines 102 a temporary PXE server RAM image and a subset of target machines 102. When each target machine 102 boots with the temporary PXE server RAM image, the target machine 102 becomes an additional temporary PXE server 104 delegated the subset of target machines 102 to PXE boot. By allowing a temporary PXE server to assign other additional temporary PXE servers as the need may arise, the boot process proceeds dynamically with greater flexibility.

Similarly, like the temporary server confirmation module 206 residing on the Master Boot Server 110, the additional server confirmation module 418 receives a subset boot confirmation from each additional temporary PXE server which indicates that all of the target machines 102 delegated to the additional temporary PXE server 104 have booted successfully.

In addition, like the image transmission module 208 residing on the master boot server 110, the additional server transmission module 420 sends each additional temporary PXE server an agent boot image in response to the subset boot confirmation from each additional temporary PXE server.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
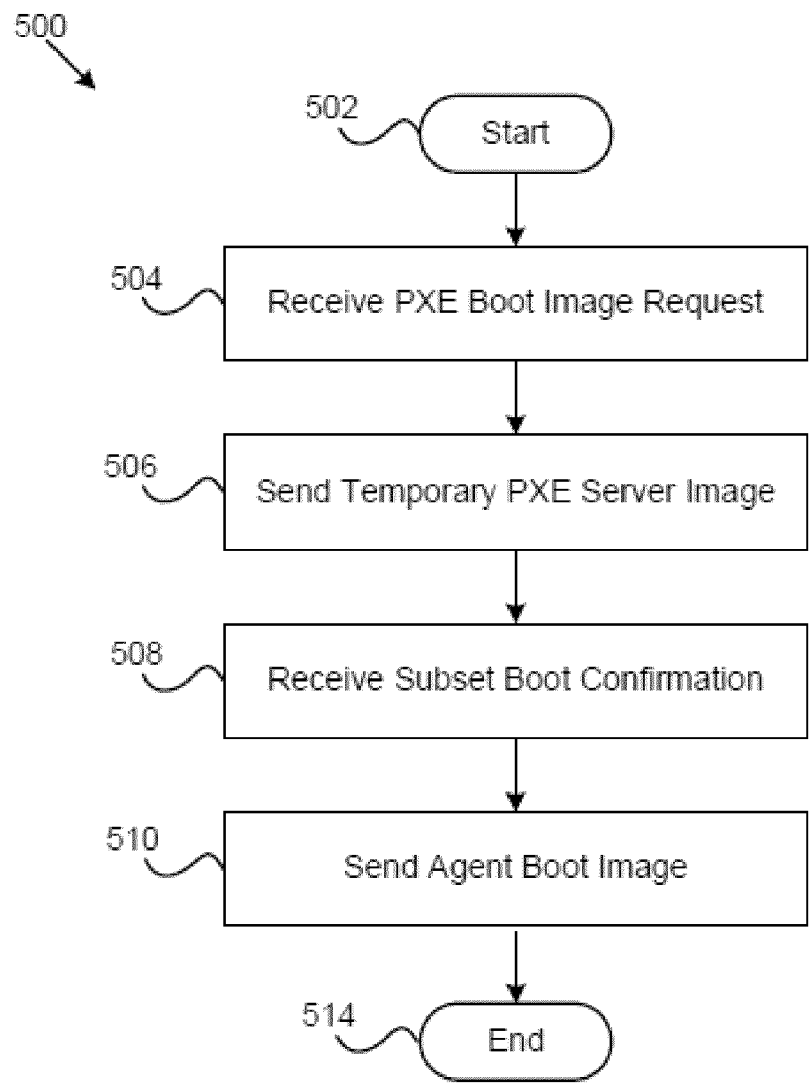
FIG. 5 is a schematic flow chart diagram illustrating one embodiment of a method for distributed PXE server booting.

FIG. 5 illustrates one embodiment of a method 500 for distributed PXE server booting. The method 500 starts 502 when the receiving module 202 receives a PXE boot image request from a plurality of target machines 102. Next, the assignment module 204 sends one or more target machines 102 a temporary PXE server RAM image and a subset of target machines to assign the recipient target machine 102 to be a temporary PXE server 104 and delegate the subset of target machines to PXE boot. Then, the temporary server confirmation module 206 receives a subset boot confirmation from each temporary PXE server 104 which indicates that the subset of target machines 102 delegated to each temporary PXE server 104 booted successfully. Finally, the image transmission module 208 sends the one or more temporary PXE servers 104 an agent boot image. Then the method 500 ends 514.

Figure 6:
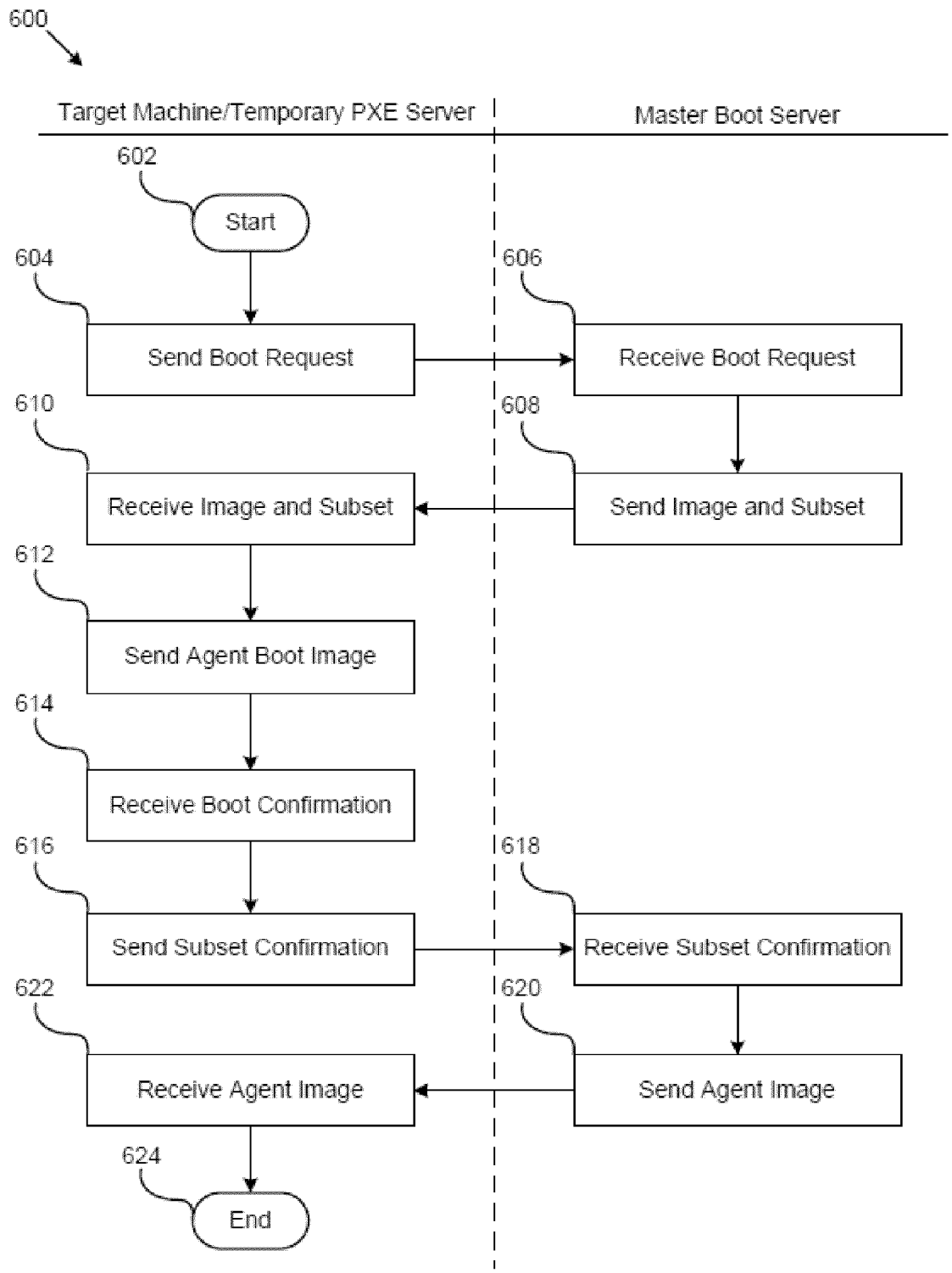
FIG. 6 is a detailed schematic flow chart diagram illustrating one embodiment of a method for distributed PXE server booting.
Figure 7A:
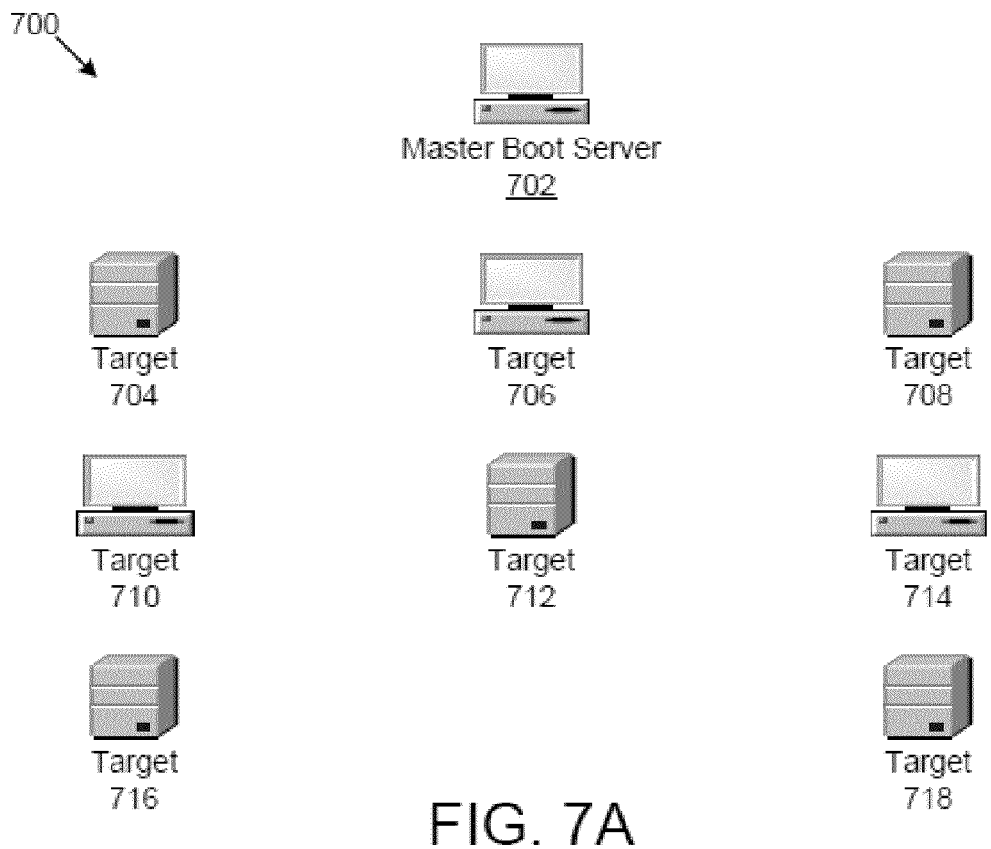
FIGS. 7-10 illustrate different stages of one embodiment of a dynamic boot process using distributed PXE server booting.
Figure 7B:
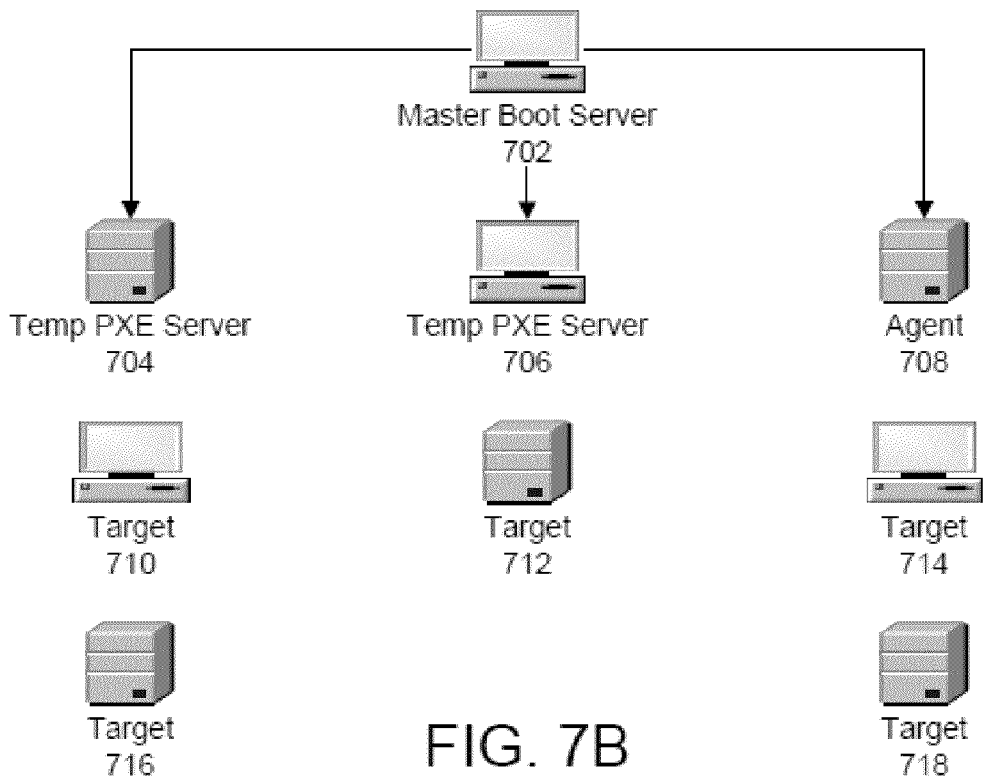

FIG. 6 illustrates a detailed embodiment of a method 600 for distributed PXE server booting. First, the method 600 starts 602 when the image request module 402 sends 604 a PXE boot image request to a master boot server 110. A PXE boot image request may be sent by several target machines 102, or target machines 102 that will be assigned as temporary PXE servers 104. The receiving module 202 of the master boot server 110 then receives 606 a PXE boot image request from these target machines 102.

The assignment module 204 of the master boot server 110 sends 608 certain target machines 102 a temporary PXE server RAM image to assign the target machine 102 as a temporary PXE server 104. In addition, the master boot server 110 sends 608 a subset of target machines to the target machine 102 to be assigned as a temporary PXE server 104 thereby delegating a subset of target machines for the temporary PXE server 104 to boot. Next, the assignment receiving module 404 of the target machine/future temporary PXE server receives 610 a temporary PXE server RAM image and a subset of target machines from the master boot server 110. The target machine/future temporary PXE server is assigned as a temporary PXE server 104 as the machine boots to the temporary PXE server RAM image.

The subset boot module 406 of the newly assigned temporary PXE server 104 sends each target machine 102 in the subset of target machines assigned to the temporary PXE server 104 an agent boot image. As each target machine 102 boots, the subset confirmation module 408 of the temporary PXE server 104 receives a boot confirmation from each target machine 102 which indicates that the target machine 102 booted successfully. The master confirmation module 410 of the temporary PXE server 104 sends 616 a subset boot confirmation to the master boot server 110 to indicate that the subset of target machines booted successfully.

The temporary PXE server confirmation module 206 of the master boot server 110 receives 618 a subset boot confirmation from each temporary PXE server 104. The image transmission module 208 of the master boot server 110 then sends 620 the temporary PXE server 104 an agent boot image. The image receiving module 412 of the temporary PXE server 104 then receives the agent boot image, thereby allowing the temporary PXE server 104 to boot as in a similar manner to the target machines 102. Then, the method 600 ends 624.

FIGS. 7-10 illustrate one embodiment of a dynamic boot process using distributed PXE server booting. FIG. 7A shows a master boot server 702 and several target machines 704-718 that require an agent boot. In FIG. 7B, the master boot server 702 assigns target machines 704 and 706 as temporary PXE servers using a temporary PXE boot and sends target machine 708 an agent boot image. In FIG. 8A, target machine 708 finishes its agent boot. Temporary PXE server 704 sends target machine 710 an agent boot image. Temporary PXE server 706 assigns target machine 712 as a temporary PXE server and sends target machine 714 an agent boot image.

Figure 8A:
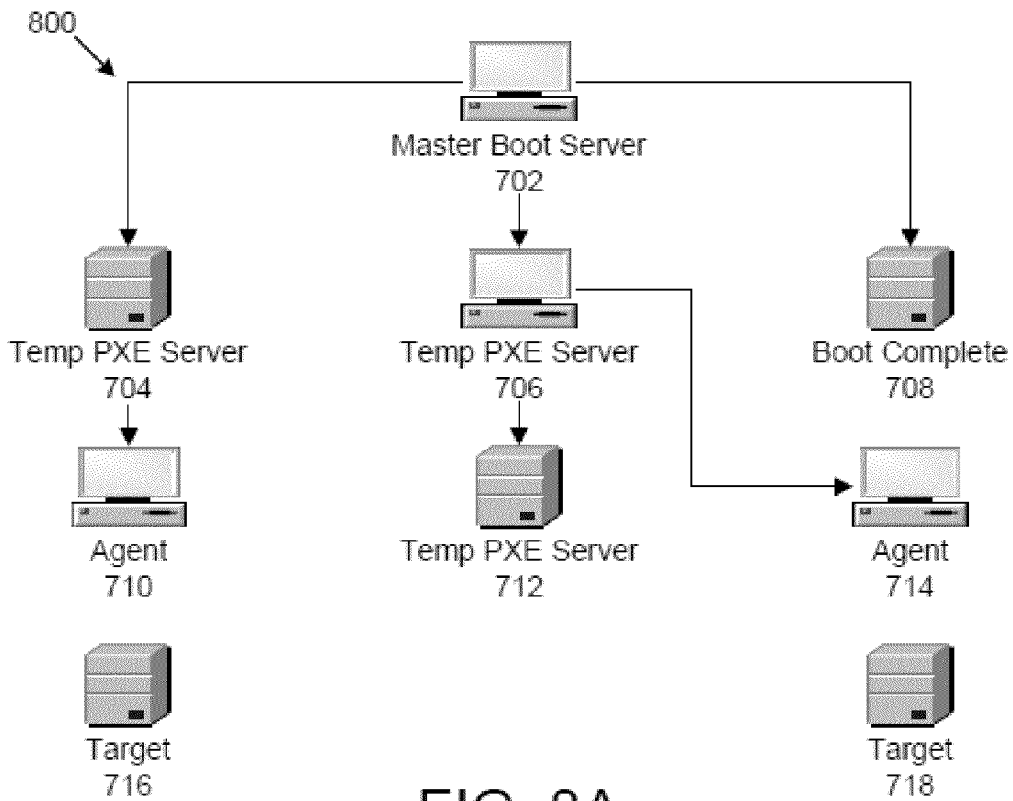
Figure 8B:
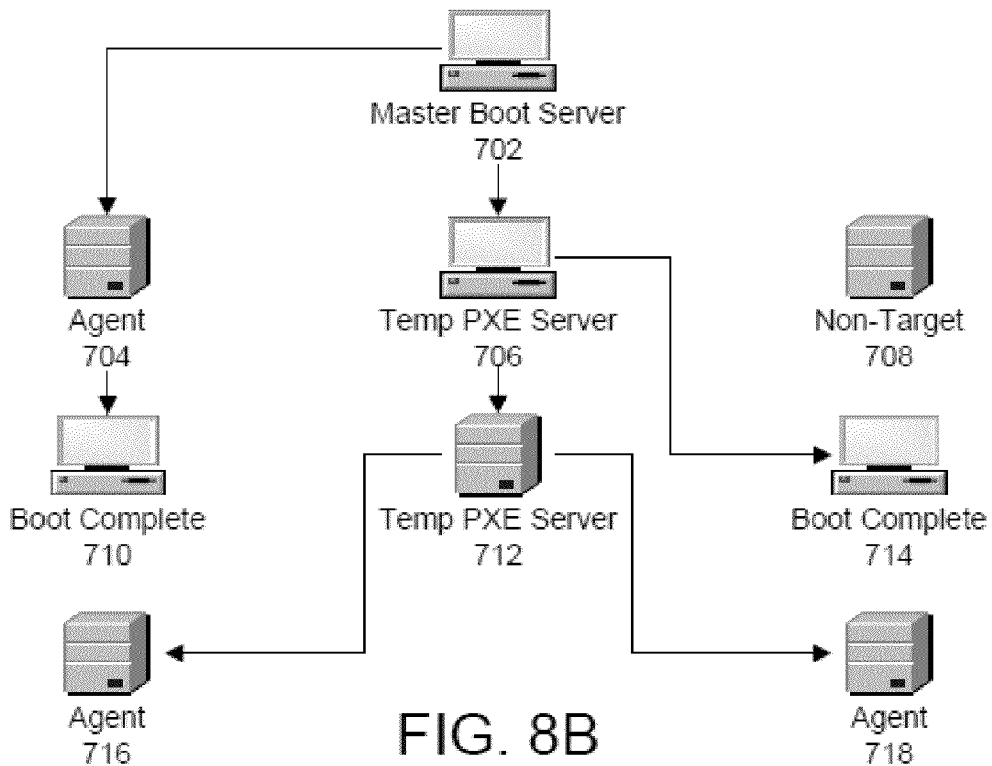
Figure 9A:
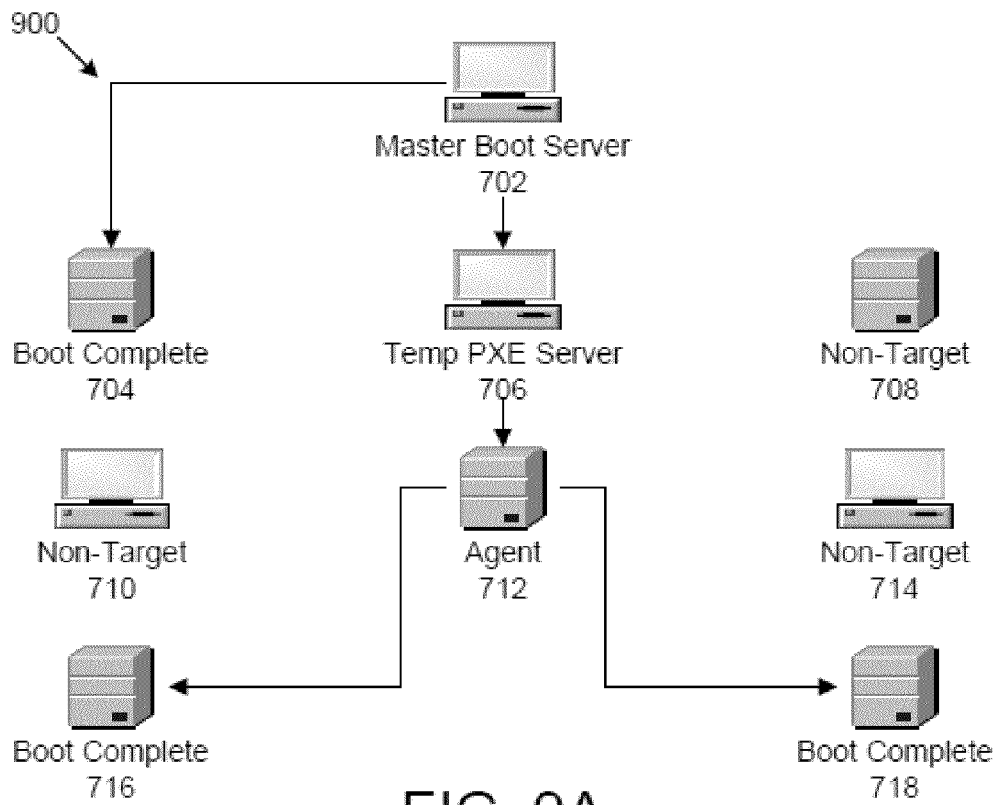

In FIG. 8B, machine 708 is now complete and is a non-target. Target machine 710 finishes its agent boot. Machine 704, having no more target machines in its subset to boot as agents, receives an agent boot image from the master boot server 702. Meanwhile, target machine 714 completes its agent boot. Temporary boot server 712 sends agent boot images to target machines 716 and 718. In FIG. 9A, machines 710 and 714 are now complete and are non-targets. Furthermore, target machine 704 completes its agent boot. Target machines 716 and 718 also complete their agent boots thus completing the temporary PXE server function of target machine 712 which receives an agent boot image from its temporary PXE server.

Figure 9B:
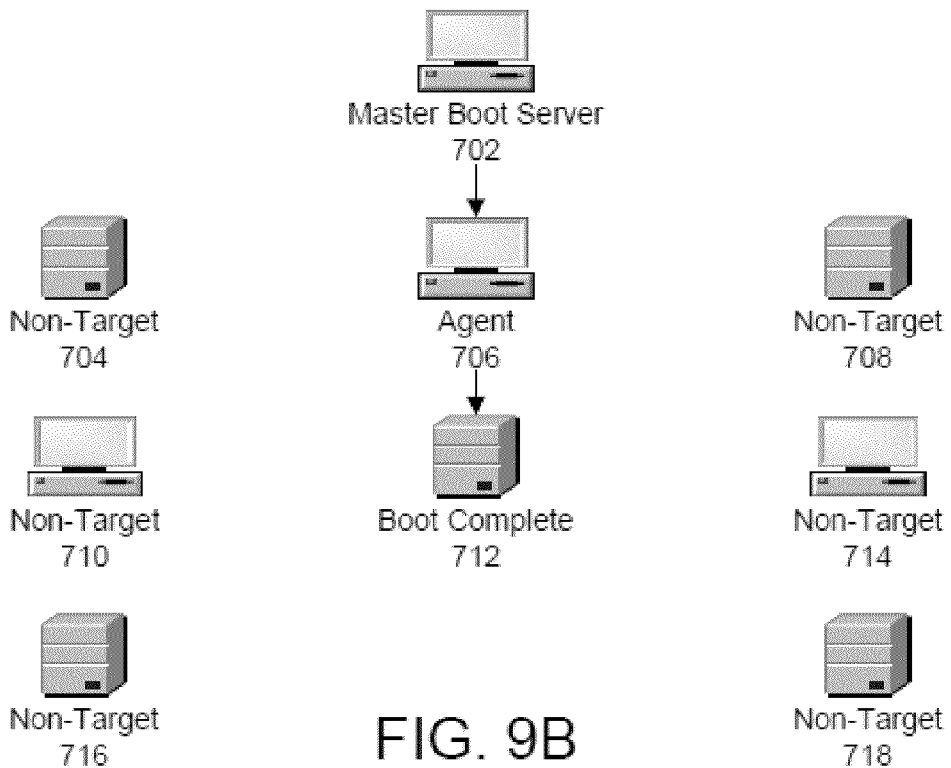
Figure 10A:
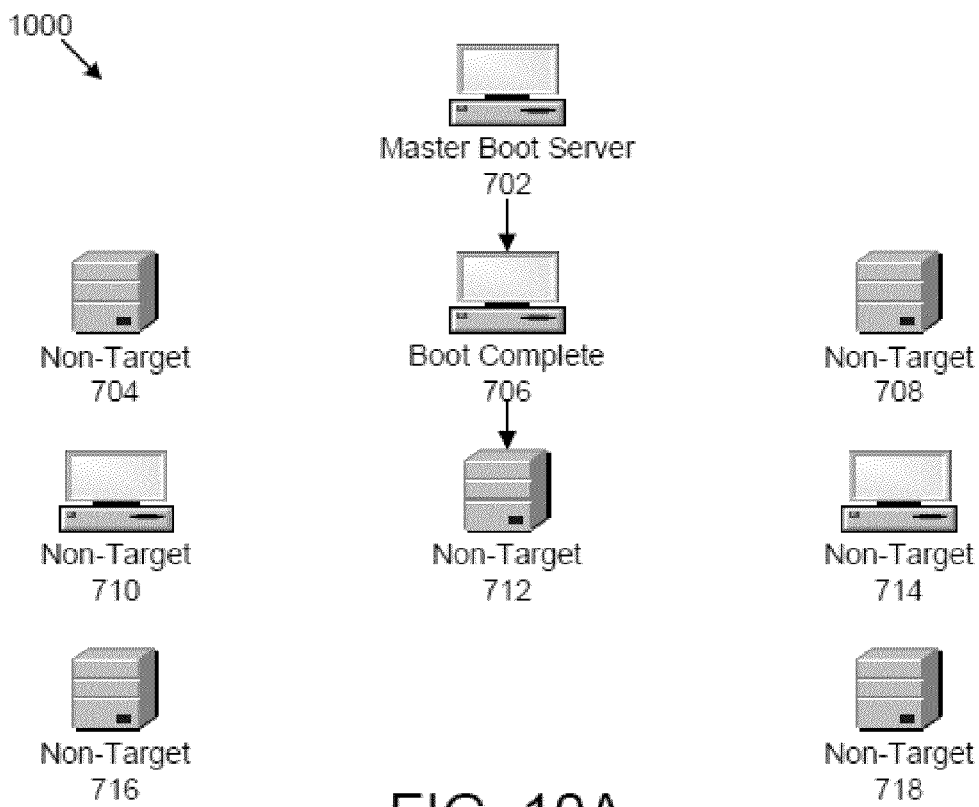
Figure 10B:
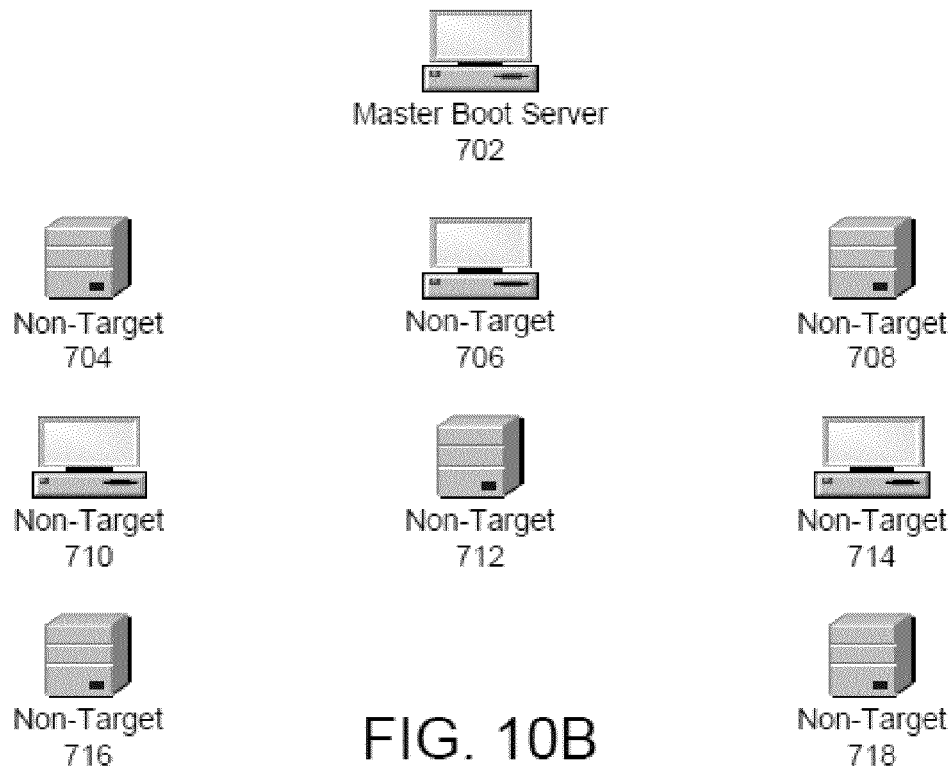

In FIG. 9B, machines 704, 716, and 718 are complete and are non-targets. Target machine 712 completes its agent boot. Consequently, target machine 706 receives an agent boot image. In FIG. 10A, machine 712 is now complete and is a non-target and target machine 706 completes its agent boot. Finally, FIG. 10B shows each machine in a completed state as non-targets.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for distributed Preboot eXecution Environment (PXE) server booting, the computer program product comprising:

a computer readable storage device to store a computer readable program, wherein the computer readable program, when executed by a processor within a computer, causes the computer to perform operations of a plurality of modules, the modules comprising:

an image request module configured to send a PXE boot image request to a master boot server;

an assignment receiving module configured to receive a temporary PXE server RAM image and a subset of target machines from the master boot server, the temporary PXE server RAM image configured to assign a recipient target machine as a temporary PXE server, the temporary PXE server configured to agent boot the subset of target machines;

a subset boot module configured to send each target machine in the subset of target machines an agent boot image;

a subset confirmation module configured to receive a boot confirmation from each target machine, the boot confirmation configured to indicate that the target machine booted successfully;

a master confirmation module configured to send a subset boot confirmation to the master boot server, the subset boot confirmation configured to indicate that the subset of target machines booted successfully; and an image receiving module configured to receive an agent boot image.

2. The computer program product of claim 1, wherein the number of target machines to assign as temporary PXE servers is determined dynamically at boot-time.

3. The computer program product of claim 1, further comprising an additional server assignment module configured to assign one or more additional temporary PXE servers.

4. The computer program product of claim 3, further comprising an additional server confirmation module configured to receive a subset boot confirmation from each additional temporary PXE server and an additional server transmission module configured to send each additional temporary PXE server an agent boot image in response to the subset boot confirmation from each additional temporary PXE server.

5. The computer program product of claim 1, wherein each target machine assigned as a temporary PXE server is configured to operate Trivial File Transfer Protocol (TFTP) in response to receiving the temporary PXE server RAM image.

6. The computer program product of claim 1, wherein each target machine assigned as a temporary PXE server is configured to operate TFTP and Proxy Dynamic Host Configuration Protocol (DHCP) in response to receiving the temporary PXE server RAM image.

7. A system for distributed Preboot eXecution Environment (PXE) server booting, the system comprising:

a network configured to communicate data between a plurality of devices;

one or more target machines in communication with the network;

one or more target machines assigned as temporary PXE servers in communication with the network, the temporary PXE servers comprising:

an image request module configured to send a PXE boot image request to a master boot server;

an assignment receiving module configured to receive a temporary PXE server RAM image and a subset of target machines from the master boot server, the temporary PXE server RAM image configured to assign a recipient target machine as a temporary PXE server, the temporary PXE server configured to agent boot the subset of target machines;

a subset boot module configured to send each target machine in the subset of target machines an agent boot image;

a subset confirmation module configured to receive a boot confirmation from each target machine, the boot confirmation configured to indicate that the target machine booted successfully;

a master confirmation module configured to send a subset boot confirmation to the master boot server, the subset boot confirmation configured to indicate that the subset of target machines booted successfully; and an image receiving module configured to receive an agent boot image; and a master boot server in communication with the network, the master boot server comprising:

a receiving module configured to receive a PXE boot image request from a plurality of target machines;

an assignment module configured to send one or more target machines a temporary PXE server RAM image and a subset of target machines, the temporary PXE server RAM image configured to assign a recipient target machine as a temporary PXE server, each temporary PXE server delegated the subset of target machines to agent boot;

an temporary server confirmation module configured to receive a subset boot confirmation from each temporary PXE server, the subset boot confirmation configured to indicate that the subset of target machines delegated to each temporary PXE server booted successfully; and an image transmission module configured to send the one or more temporary PXE servers an agent boot image in response to the subset boot confirmation from each temporary PXE server.

8. The system of claim 7, wherein the master server further comprises an temporary server determination module configured to determine an temporary server requirement, the temporary server requirement comprising an optimal number of target machines to assign as temporary PXE servers, the temporary server requirement based on a predetermined number of target machines which require booting.

9. The system of claim 8, wherein the temporary server requirement is user-configurable.

10. The system of claim 8, wherein the temporary server requirement is based on a boot image size and network capacity.

11. The system of claim 7, wherein the master server further comprises a tree determination module configured to determine a booting tree, the booting tree configured to indicate target machines for temporary PXE server assignment by the master server and configured to indicate the subsets of target machines delegated to each temporary PXE server.

* * * * *